(12) United States Patent
Hayashi

(10) Patent No.: US 6,462,853 B2
(45) Date of Patent: Oct. 8, 2002

(54) OPTICAL SCANNING DEVICE

(75) Inventor: Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/824,842

(22) Filed: Apr. 4, 2001

(65) Prior Publication Data

US 2001/0055139 A1 Dec. 27, 2001

(30) Foreign Application Priority Data

Apr. 5, 2000 (JP) ........................................ 2000-103004

(51) Int. Cl.$^7$ .............................................. G02B 26/08
(52) U.S. Cl. ........................ 359/205; 359/196; 359/217; 347/263
(58) Field of Search ................................ 359/196, 205, 359/206, 216, 217, 218, 219; 347/261, 263

(56) References Cited

U.S. PATENT DOCUMENTS

| | | |
|---|---|---|
| 5,557,448 | 9/1996 | Endo et al. |
| 5,570,224 | 10/1996 | Endo et al. |
| 5,581,392 | 12/1996 | Hayashi |
| 5,652,670 | 7/1997 | Hayashi |
| 5,786,594 | 7/1998 | Ito et al. |
| 5,875,051 | 2/1999 | Suzuki et al. |
| 5,936,756 | 8/1999 | Nakajima |
| 5,986,791 | 11/1999 | Suzuki et al. |
| 5,999,345 | 12/1999 | Nakajima et al. |
| 6,052,211 | 4/2000 | Nakajima |
| 6,069,724 | 5/2000 | Hayashi et al. |
| 6,081,386 | 6/2000 | Hayashi et al. |
| 6,091,534 | 7/2000 | Nakajima |
| 6,104,520 | * 8/2000 | Yamawaki .................. 359/205 |
| 6,104,522 | 8/2000 | Hayashi et al. |
| 6,141,133 | 10/2000 | Suzuki et al. |
| 6,185,026 | 2/2001 | Hayashi et al. |
| 6,198,562 | 3/2001 | Hayashi et al. |
| 6,222,662 | 4/2001 | Suzuki et al. |
| 6,229,638 | 5/2001 | Sakai et al. |
| 6,239,860 | 5/2001 | Ito |

FOREIGN PATENT DOCUMENTS

JP    9-274134    10/1997

* cited by examiner

Primary Examiner—Mark A. Robinson
(74) Attorney, Agent, or Firm—Oblon, Spivak, McClelland, Maier & Neustadt, P.C.

(57) ABSTRACT

An optical scanning device comprises two transmission optical components each having approximately planar surfaces on both sides thereof. These transmission optical components are disposed so as to have at least one scanning and imaging component inserted therebetween. The first transmission optical component is disposed at a light exit of a cover covering a light deflector. The second transmission optical component is disposed at a light exit of the optical housing. The two transmission optical components are inclined in a sub-scanning section included in a same direction in a straight line perpendicular to the surface to be scanned. The first transmission optical component is inclined with respect to the surface to be scanned in a deflection scanning plane. The second transmission optical component lies approximately in parallel to the surface to be scanned in the deflection scanning plane. The polarization directions of the beam directed to the light deflector are approximately perpendicular to the deflection scanning directions.

4 Claims, 5 Drawing Sheets

FIG. 1A
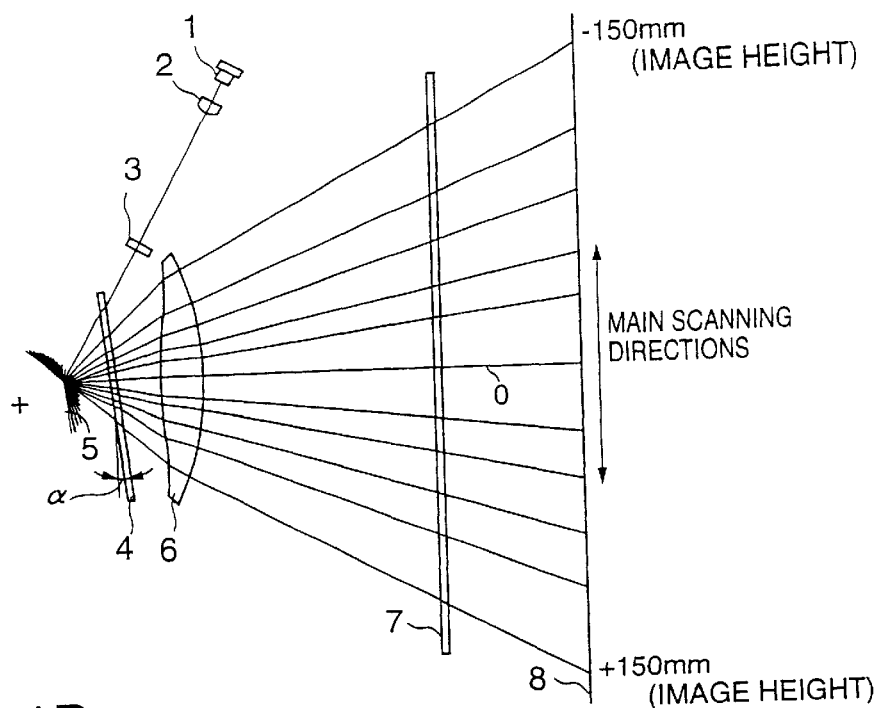
FIG. 1B
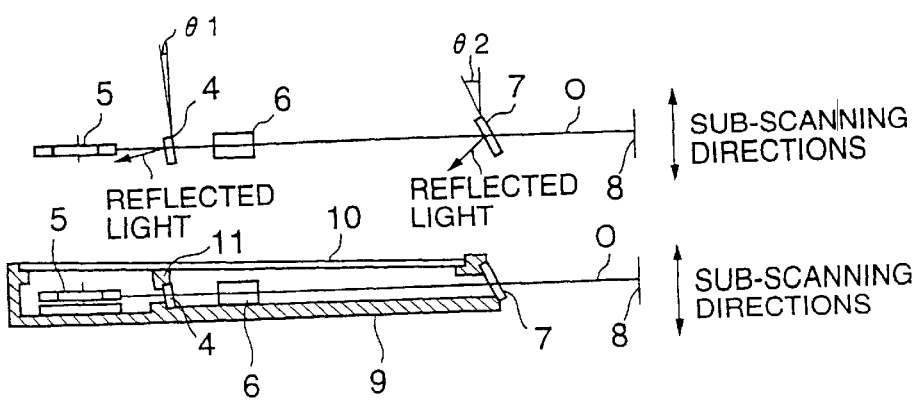
FIG. 1C

OPTICAL SCANNING DEVICE

BACKGROUND OF THE INVENTION

1. Field of the Invention

The present invention generally relates to an optical scanning device used in an image forming apparatus, such as a laser printer, a digital copier, a laser facsimile, a laser plotter and so forth, as an optical writing part or the like thereof.

2. Description of the Related Art

Such an optical scanning device has been known in which a beam emitted from a light source such as a semiconductor laser or the like is deflected by a light deflector such as a polygon mirror, the deflected beam is condensed toward a surface to be scanned such as a photosensitive body or the like by a scanning and imaging component so that a beam spot is formed thereby on the surface to be scanned, and the surface to be scanned is scanned by the beam spot.

In an image forming apparatus of an electrophotographic type employing such an optical scanning device, optical scanning of an electrically charged photosensitive body is performed with a beam modulated in accordance with image information by the optical scanning device. Thereby, an electrostatic latent image is formed on the photosensitive body. This latent image is visualized with toner by a developing device, is then transferred and fixed to a recording paper sheet or the like. Thus, a record image is obtained. However, in such an image forming part of the image forming apparatus, floating toner is generated, powder is generated from the recording paper sheet, and so forth. When such floating dust enters the optical scanning device, it adheres to the scanning and imaging component, light deflector and so forth. Thereby, the optical scanning cannot be performed properly. In order to solve this problem, the light source, light deflector, scanning and imaging component and so forth are enclosed by an optical housing, and, a light exit thereof through which a beam exits is sealed up by a transparent parallel plate for dustproof, in the related art.

Further, in such an optical scanning device, for the purpose of preventing generation of noise in a light deflector such as a polygon mirror or the like, stain of the deflection reflective surface of the light deflector, and so forth, the light deflector is covered by a housing or a cover, and a light entrance of a beam toward the light deflector and a light exit of the beam from the light deflector are sealed up by a transparent parallel plate for soundproof and dustproof.

However, when such a transparent parallel plate for soundproof and/or dustproof is provided for the optical housing covering the entirety of the optical scanning device, or, for a housing of the light deflector, ghost light is generated as a result of a beam reflected by the transparent parallel plate returns to the deflection reflective surface of the light deflector, astigmatic difference of the transparent parallel plate adversely affects the imaging performance of the scanning and imaging component, and so forth.

In order to solve these problems, the parallel plate for soundproof and dustproof is inclined with respect to the optical axis so that the beam reflected thereby is prevented from returning to the deflection reflective surface of the light deflector.

However, by simply inclining the parallel plate with respect to the optical axis, bending of scan line occurs on the surface to be scanned.

Further, it is preferable that a transmission optical component such as a transparent parallel plate is as small as possible. Further, unevenness in light intensity (shading) occurs on the surface to be scanned due to the transmission optical component, and, thereby, the record image is degraded.

SUMMARY OF THE INVENTION

The present invention has been devised in consideration of the above-described situation, and, an object of the present invention is to eliminate ghost light while dustproof and soundproof is achieved, and, also, to reduce bending of scan line.

Another object of the present invention is to reduce unevenness in light intensity (shading) on the surface to be scanned.

In order to achieve these objects, an optical scanning device according to the present invention includes:

a light deflector performing deflection scanning through reflection of a beam coming from a light source; and at least one scanning and imaging component condensing the beam having undergone the deflection scanning performed by the light deflector toward a surface to be scanned, these components being enclosed by an optical housing, wherein:

the device further comprises two transmission optical components each having approximately planar surfaces on both sides thereof;

the two transmission optical components are disposed so as to have the at least one scanning and imaging component inserted therebetween;

one of the two transmission optical components (one nearer to the light deflector) is disposed at a light exit of a cover covering the light deflector;

the other of the two transmission optical components is disposed at a light exit of the optical housing;

the two transmission optical components are inclined in a same direction in a sub-scanning section including a straight line perpendicular to the surface to be scanned;

the transmission optical component disposed at the light exit of the cover of the light deflector is inclined with respect to the surface to be scanned in a deflection scanning plane;

the transmission optical component disposed at the light exit of the optical housing lies approximately in parallel to the surface to be scanned in the deflection scanning plane; and the polarization directions of the beam directed to the light deflector are approximately perpendicular to the deflection scanning directions.

Thus, by configuring the optical scanning device such that the two transmission optical components disposed at the light exit of the cover covering the light deflector and at the light exit of the optical housing are inclined in the same direction in the sub-scanning section including the straight line perpendicular to the surface to be scanned, light reflected by the transmission optical components is prevented from returning to any of the deflection reflective surface of the light deflector and the scanning and imaging component. Accordingly, it is possible to prevent ghost light from being generated while dustproof and soundproof of the optical scanning device are rendered. Further, it is possible to well correct bending of scan line on the surface to be scanned.

As mentioned above, the transmission optical component disposed at the light exit of the cover of the light deflector is inclined with respect to the surface to be scanned in the deflection scanning plane; the transmission optical component disposed at the light exit of the optical housing lies approximately in parallel to the surface to be scanned in the deflection scanning plane; and the polarization directions of the beam directed to the light deflector are approximately perpendicular to the deflection scanning directions. Thereby, characteristics of reflectivity of the light deflector for respective field angles and a characteristic of transmittance of the transmission optical component, which is the one nearer to the light deflector, are cancelled out by one another. Accordingly, it is possible to effectively reduce shading (unevenness in light intensity on the surface to be scanned). Further, it is possible to reduce both transmission optical components in size as a result of the transmission optical components being disposed as mentioned above. Accordingly, it is possible to improve the optical scanning device in performance and in costs.

Further, the following conditional formula may be satisfied:

$$2.5 < (d2 \times \sin \theta 2)/(d1 \times \sin \theta 1 \times |\beta|) < 7.0$$

where:

$\theta 1$ denotes a rotation angle of the transmission optical component having the approximately planar surfaces on both sides thereof, which is the one nearer to the light deflector;

$\theta 2$ denotes a rotation angle of the other transmission optical component having the approximately planar surfaces on both sides thereof;

$\beta$ denotes a sub-scanning lateral magnification between the light deflector and the surface to be scanned;

d1 denotes a thickness of the transmission optical component having the approximately planar surfaces on both sides thereof, which is the one nearer to the light deflector; and d2 denotes a thickens of the other transmission optical component having the approximately planar surfaces on both sides thereof.

Thereby, it is possible to reduce the bending of scan line on the surface to be scanned effectively.

In the optical scanning device according to the present invention, mainly a semiconductor laser (LD) or the like is used as the light source. However, a light emitting diode (LED) or the like may be used alternatively. The beam coming from the light source is coupled by a coupling lens or the like, and, thereby, the beam becomes a parallel beam, divergent beam or a convergent beam, which is then incident on the light deflector.

As the light deflector, a polygon mirror having a plurality of deflection reflective surfaces, a rotational single-surface mirror such as a pyramidal mirror, a tenon-type mirror or the like, or a swinging mirror such as a galvano mirror may be used.

Further, in order to correct so-called surface inclination, the coupled beam may be condensed only along the sub-scanning directions by an optical system such as a cylindrical lens disposed on the light path between the coupling lens and light deflector so that the beam is used for imaging a line image long along the main scanning directions at a position of the deflection reflective surface of the light deflector.

The scanning and imaging component is used for imaging a minute beam spot on the surface to be scanned with the beam having undergone deflection scanning performed by the light deflector, and includes at least one lens, mirror or the like having a power along the main scanning directions and/or sub-scanning directions. When the light deflector is of a rotational member such as a polygon mirror, a scanning and imaging lens such as an fθ lens or the like, fθ mirror or the like may be preferably used. When the light deflector is a swinging mirror, a scanning and imaging lens such as an f sin θ lens or the like may be used. By using such a scanning and imaging component, it is possible to make the main scanning speed uniform.

Further, when the coupled beam is condensed only along the sub-scanning directions and is used for imaging a line image long along the main scanning directions at the position of the deflection reflective surface of the light deflector for the purpose of correcting surface inclination as mentioned above, the scanning and imaging component has a function of causing the position of the deflection reflective surface and the position of the surface to be scanned to be approximately conjugate in geometrical optics for the sub-scanning directions.

The transmission optical component mounted at the light exit of the cover covering the light deflector and the transmission optical component mounted at the light exit of the optical housing may be parallel plates made of transparent glass or resin each having approximately planar surfaces on both sides thereof preferably, and function as dustproof and soundproof members. However, they are not limited to parallel plates, and may be transparent plates each having a slight angle between both sides thereof.

Other objects and further features of the present invention will become more apparent from the following detailed description when read in conjunction with the accompanying drawings.

BRIEF DESCRIPTION OF THE DRAWINGS

FIGS. 1A, 1B and 1C illustrate a configuration of an optical scanning device in any one of embodiments 1 through 9 of the present invention;

DETAILED DESCRIPTION OF THE PREFERRED EMBODIMENTS

Figure 2A:
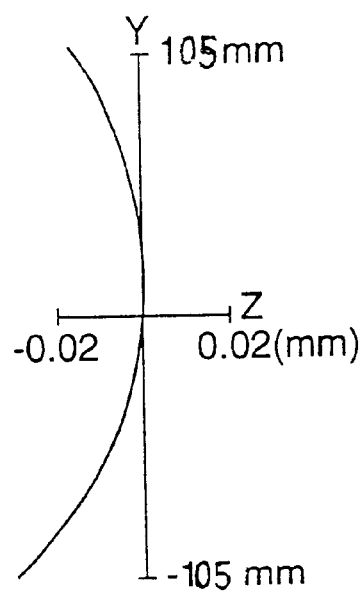
FIGS. 2A and 2B show bending of scan line in comparison examples 1 and 2.

FIGS. 1A, 1B and 1C illustrate a configuration of an optical scanning device in each embodiment of the present invention. FIG. 1A shows a sectional plan view of a configuration of an optical system taken along a plane (main scanning section) parallel to directions (main scanning directions) of deflection of a beam rendered by a light deflector and including an optical axis of a scanning and imaging lens 6. FIG. 1B shows a side-elevational sectional view of the configuration of the optical system taken along a plane (sub-scanning section) perpendicular to the main scanning section and including the optical axis of the scanning and imaging lens 6. FIG. 1C shows a side-elevational sectional view of a configuration when the optical system of the optical scanning device is enclosed by an optical housing taken along the sub-scanning section.

The optical scanning device shown in FIGS. 1A, 1B and 1C includes a light source 1 such as a semiconductor laser or the like, a coupling lens 2 which couples a beam coming from the light source 1 so as to emit a parallel beam, a divergent beam or a convergent beam, a cylindrical lens 3 which condenses the beam coupled by the coupling lens 2 only along the sub-scanning directions so as to cause the beam to image a line image long along the main scanning directions at a position of a deflection reflective surface of a light deflector 5, the light deflector 5 such as a polygon mirror which deflects the beam having passed through the cylindrical lens 3 so as to scan a surface to be scanned 8 by the beam, and the scanning and imaging lens 6 which condenses the beam deflected by the light deflector 5 onto the surface to be scanned 8 such as a photosensitive body. These components are enclosed by an optical housing 9, and the top of the optical housing 9 is covered by a cover 10.

Further, the optical scanning device shown in FIGS. 1A, 1B and 1C includes first and second parallel plates 4 and 7 each of which is a transmission optical component having both sides of approximately planar surfaces. These two parallel plates 4 and 7 are disposed in positions such that the scanning and imaging lens 6 is disposed therebetween. The first parallel plate 4 is mounted on a light exit of a cover 11 which covers the light deflector 5 so as to seal up the light exit. The second parallel plate 7 is mounted on a light exit of the optical housing 9, and seals up the light exit.

Further, the two parallel plates 4 and 7 are disposed so as to be inclined in a same direction in the sub-scanning section including a straight line (corresponding to the optical axis O of the scanning and imaging lens 6) perpendicular to the surface to be scanned 8.

Further, the parallel plate 4 (first parallel plate disposed at the light exit of the cover 11 of the light deflector 5) which is the one nearer to the light deflector 5 is inclined in a deflection scanning section (main scanning section) with respect to the surface to be scanned 8. The parallel plate 7 (second parallel plate disposed at the light exit of optical housing 8) which is the one farther from the light deflector 5 is approximately parallel to the surface to be scanned 8 in the deflection scanning section.

Further, the polarization directions of the beam directed to the light deflector 5 are approximately perpendicular to the deflection scanning directions (main scanning directions).

In the optical scanning device having the above-described configuration shown in FIGS. 1A, 1B and 1C, the beam emitted from the light source 1 is coupled by the coupling lens 2 so as to become an approximately parallel beam, for example, is condensed only along the sub-scanning directions by the cylindrical lens 3 so as to image a line image long along the main scanning directions at the position of the deflection reflective surface of the light deflector 5, and, then, is deflected by the deflection reflective surface of the light deflector 5, passes through the first parallel plate 4, then, becomes a convergent beam through the scanning and imaging lens 6, passes through the second parallel plate 7, is thus condensed so as to form a beam spot on the surface to be scanned 8, which is used for scanning the surface to be scanned 8 along the main scanning direction at a uniform velocity.

In a case of an optical scanning device having such a configuration, there is a possibility that, due to disposition of the parallel plate 4 sealing up the light exit of the cover 11 of the light deflector 5 and the parallel plate 7 sealing up the light exit of the optical housing 9, ghost light is generated from the light reflected by these parallel plates 4 and 7. However, in the optical scanning device according to the present invention, as shown in FIG. 1B, the two parallel plates 4 and 7 are inclined in the same direction in the sub-scanning section including the straight line O (optical axis of the scanning and imaging lens) perpendicular to the surface to be scanned. Accordingly, the light reflected by these parallel plates 4 and 7 is directed in a direction inclined in the sub-scanning direction. Thereby, the reflected light is prevented from returning to the deflection reflective surface of the light deflector 5 or scanning and imaging lens 6. As a result, no ghost light can be generated therefrom.

Further, in the optical scanning device according to the present invention, as shown in FIG. 1C, the second parallel plate 7 is mounted so as to seal up the light exit of the optical housing 9, Accordingly, thereby, no dust can enter the optical housing 9 of the optical scanning device externally. Further, the first parallel plate 4 is mounted so as to seal up the light exit of the cover 11 covering the light deflector 5. Accordingly, thereby, the light deflector 5 is sealed up, and, no dust can enter to the light deflector 5. Also, noise generated due to rotation of the light deflector 5 can be reduced thereby. Further, as a result of the two parallel plates 4 and 7 being inclined in the same direction in the sub-scanning section, it is possible to effectively correct bending of scan line on the surface to be scanned 8.

Each of the parallel plates 4 and 7 is a parallel plate made of transparent glass, resin or the like, and has both sides of approximately planar surfaces, acting as one example of a transmission optical component. However, each thereof is not limited to parallel plate, and may be a transparent plate material or the like having both sides with a slight angle formed therebetween.

Embodiments of the optical system of the above-described optical scanning device according to the present invention will now be described.

① Optical system A (scanning and imaging lens includes only a single lens):

| Surface number | Rm (mm) | Rs (0) (mm) | X (mm) | N | Note |
|---|---|---|---|---|---|
| 0 | ∞ | ∞ | 33.1 | | polygon mirror |
| 1 | 160.3 | −108.6 | 13.5 | 1.5193 | scanning and imaging lens |
| 2 | −139.3 | −15.2 | 128.6 | | |
| 3 | — | — | — | | surface to be scanned |

In the above table, the surface number 0 represents the deflection reflective surface of the light deflector. The surface number 1 represents the surface of the scanning and imaging lens on the light-incident side. The surface number 2 represents the surface of the scanning and imaging lens on the light-exiting side. 'N' represents the refractive index of the scanning and imaging lens. 'X' denotes the surface separation between the surface of the surface number and the surface of the subsequent surface number.

Further, 'Rm' represents the radius of curvature along the main scanning directions. 'Rs(0)' represents the radius of curvature along the sub-scanning directions at the position of the optical axis. Each of the surfaces of the surface number 1 and surface number 2 of the scanning and imaging lens has a non-arc shape along the main scanning directions, and the radius of curvature Rs(Y) along the sub-scanning directions varies continuously according to the lens height.

The surface shape thereof along the main scanning directions is expressed by the following formula:

$$X=(Y^2/Rm)/(1+\sqrt{1-(1+K)\times(Y/Rm)^2})+AY^4+BY^6+CY^8+DY^{10} \quad (1)$$

In the above formula (1), for the surface of the surface number 1:
K=−58.38, A=−9.23×10$^{-7}$, B=3.66×10$^{-10}$, C=−8.34×10$^{-14}$, D=1.11×10$^{-17}$.

For the surface of the surface number 2:
K=4.83, A=−9.71×10$^{-7}$, B=2.37×10$^{-10}$, C=−8.06×10$^{-14}$, D=2.65×10$^{-17}$.

Assuming that Rs(Y) denotes the radius of curvature (radius of sub-scanning curvature) in a plane perpendicular to the deflection directions in which the distance Y from the optical axis along the main scanning directions is used as a variable, $$Rs(Y)=Rs(0)+\Sigma bj \cdot Y^j \quad (j=1, 2, 3, \ldots) \quad (2)$$

There, for the surface of the surface number 1,
b2=7.80×10$^{-2}$, b4=−3.15×10$^{-4}$, b6=8.17×10$^{-7}$, b8=−1.10×10$^{-9}$, b10=7.35×10$^{-13}$, b12=−1.88×10$^{-16}$, (each of all the other coefficients is 0).

For the surface of the surface number 2,
b2=−1.69×10$^{-3}$, b4=3.42×10$^{-6}$, b6=−4.29×10$^{-9}$, b8=5.63×10$^{-12}$, b10=−4.19×10$^{-15}$, b12=1.30×10$^{-18}$, (each of all the other coefficients is 0).

In this optical system, the first parallel plate is disposed between the deflection reflective surface of the light deflector and the scanning and imaging lens at a position 16.0 mm away from the deflection reflective surface, and is inclined/rotated by 6 degrees ($\alpha$ in FIG. 1A) with respect to the main scanning directions in the deflection scanning plane (main scanning section) around a rotation axis parallel to the sub-scanning directions.

Further, the second parallel plate is disposed between the scanning and imaging lens and the surface to be scanned at a position 79.5 mm away from the scanning and imaging lens, and is approximately in parallel with the surface to be scanned in the deflection scanning plane (main scanning section).

② Optical system B (scanning and imaging lens includes two lenses):

| Surface number | Rm (mm) | Rs (0) (mm) | X (mm) | N | Note |
|---|---|---|---|---|---|
| 0 | ∞ | ∞ | 52.6 | | polygon mirror |
| 1 | −312.6 | −312.6 | 31.4 | 1.524 | first scanning and imaging lens |
| 2 | −83.0 | −83.0 | 78.0 | | |
| 3 | −500 | −47.7 | 3.5 | 1.524 | second scanning and imaging lens |
| 4 | −1000 | −23.38 | 143.6 | | |
| 5 | — | — | — | | surface to be scanned |

In the above table, the surface number 0 represents the deflection reflective surface of the light deflector. The surface number 1 represents the surface, on the light-incident side, of the first scanning and imaging lens, which is the one nearer to the light deflector. The surface number 2 represents the surface, on the light-exiting side, of the first scanning and imaging lens. The surface number 3 represents the surface, on the light-incident side, of the second scanning and imaging lens. The surface number 4 represents the surface, on the light-exiting side, of the second scanning and imaging lens. 'N' represents the refractive indexes of the first and second scanning and imaging lenses. 'X' denotes the surface separation between the surface of the surface number and the surface of the subsequent surface number.

Further, 'Rm' represents the radius of curvature along the main scanning directions. 'Rs(0)' represents the radius of curvature along the sub-scanning directions at the position of the optical axis. Each of the surfaces of the surface number 1 and surface number 2 of the first scanning and imaging lens has a coaxial aspherical surface, and the surface shape thereof is expressed by the following formula:

$$X=(Y^2/R)/(1+\sqrt{1-(1+K)\times(Y/R)^2})+AY^4+BY^6+CY^8+DY^{10} \quad (3)$$

In the above formula (3), for the surface of the surface number 1:
K=2.667, A=1.79×10$^{-7}$, B=−1.08×10$^{-12}$, C=−3.18×10$^{-14}$, D=3.74×10$^{-18}$ For the surface of the surface number 2:
K=0.02, A=2.50×10$^{-7}$, B=9.61×10$^{-12}$, C=4.54×10$^{-15}$, D=−3.03×10$^{-18}$.

The surface of the surface number 3 of the second scanning and imaging lens has a non-arc shape along the main scanning directions, and the radius of curvature Rs(Y) along the sub-scanning directions varies continuously according to the lens height. The main-scanning shape of the surface of the surface number 3 is expressed by the above-mentioned formula (1), and therefor:
K=−71.73, A=4.33×10$^{-8}$, B=−5.97×10$^{-13}$, C=−1.28×10$^{-16}$, D=5.73×10$^{-21}$.

The radius of sub-scanning curvature Rs(Y) of the surface of the surface number 3 is expressed by the above-mentioned formula (2), and therefor:
b2=1.60×10$^{-3}$, b4=−2.32×10$^{-7}$, b6=1.60×10$^{-11}$, b8=−5.61×10$^{-16}$, b10=2.18×10$^{-20}$, b12=−1.25×10$^{-24}$, (each of all the other coefficients is 0).

In this optical scanning optical system, the first parallel plate is disposed between the deflection reflective surface the light deflector and first scanning and imaging lens. This first parallel plate is located 12.0 mm away from the deflection reflective surface of the light deflector and is inclined/rotated by 8 degrees (the angle $\alpha$ in FIG. 1A) with respect to the main scanning directions in the deflection scanning plane (main scanning section) around a rotation axis parallel to the sub-scanning directions.

The second parallel plate is disposed between the second scanning and imaging lens and surface to be scanned. This second parallel plate 7 is located 8.0 mm away from the second scanning and imaging lens and lies approximately in parallel to the surface to be scanned in the deflection scanning plane (main scanning section).

Then, the following value D is calculated when the rotation angles of the first and second parallel plates are changed for the above-mentioned optical systems A and B:

$$D=(d2\times\sin\theta 2)/(d1\times\sin\theta 1\times|\beta|) \quad (4)$$

where θ1 (indicated in FIG. 1B) denotes the rotation angle of the first parallel plate with respect to the sub-scanning directions around a rotation axis lying in the section along the deflection scanning directions (main scanning section) and parallel to the main scanning directions, θ2 (indicated in FIG. 1B) denotes the rotation angle of the second parallel plate with respect to the sub-scanning directions around a rotation axis lying in the section along the deflection scanning directions (main scanning section) and parallel to the main scanning directions, where, for each of the angles θ1 and θ2, the counterclockwise direction is assumed as a positive direction, β denotes the lateral magnification along the sub-scanning directions between the deflection reflective surface of the light deflector and the surface to be scanned, d1 denotes the thickness of the first parallel plate, and d2 denotes the thickness of the second parallel plate.

Then, results of the calculation are shown below, where cases satisfying the following conditional formula are determined as the embodiments while cases not satisfying the same are determined as comparison examples:

$$2.5<(d2\times\sin\theta 2)/(d1\times\sin\theta 1\times|\beta|)<7.0 \quad (5)$$

|  | optical system | θ1 (°) | θ2 (°) | \|β\| | d1 (mm) | d2 (mm) | D |
|---|---|---|---|---|---|---|---|
| Comparison example 1 | A | 2 | 0 | 2.9 | 1.9 | 1.9 | 0.0 |
| Comparison example 2 | A | 2 | 55 | 2.9 | 1.9 | 1.9 | 8.1 |
| Embodiment 1 | A | 2 | 15 | 2.9 | 1.9 | 1.9 | 2.6 |
| Embodiment 2 | A | 2 | 20 | 2.9 | 1.9 | 1.9 | 3.4 |
| Embodiment 3 | A | 3 | 25 | 2.9 | 1.9 | 1.9 | 2.8 |
| Embodiment 4 | A | 3 | 15 | 2.9 | 1.9 | 3.0 | 2.7 |
| Embodiment 5 | B | 5 | 20 | 1.1 | 1.9 | 1.9 | 3.5 |
| Embodiment 6 | B | 2 | 10 | 1.1 | 1.9 | 1.9 | 4.4 |
| Embodiment 7 | B | 2 | 16 | 1.1 | 1.9 | 1.9 | 7.0 |
| Embodiment 8 | B | 2 | 5 | 1.1 | 2.0 | 4.0 | 4.4 |

When the first parallel plate disposed between the light deflector and the scanning and imaging lens is inclined, bending of scan line occurs. The amount thereof increases as d1, sin θ1 and |β| increase. The bending of scan line occurring due to the first parallel plate can be corrected through inclination of the second parallel plate disposed between the scanning and imaging lens and the surface to be scanned in the same direction. The amount of the correction increases as d2 and sin θ2 increase.

When the value of D of the above-mentioned formula (4) exceeds the lower limit of the conditional formula (5) as in the comparison example 1, the bending of scan line occurring due to the first parallel plate cannot be corrected by the second parallel plate. Accordingly, as shown in FIG. 2A, the bending of scan line is large in the comparison example 1.

Figure 2B:
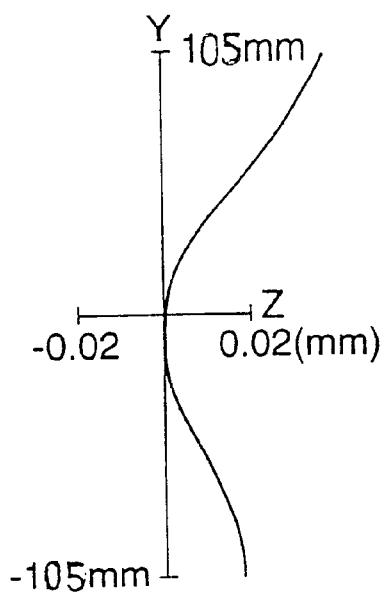

Further, when the value of D of the above-mentioned formula (4) exceeds the upper limit of the conditional formula (5) as in the comparison example 2, the bending of scan line occurring due to the first parallel plate is corrected by the second parallel plate too much. Accordingly, as shown in FIG. 2B, the bending of scan line is also large in the comparison example 2. In this case, the direction of the bending of scan line is opposite to that in the case of the comparison example 1.

Figure 3:
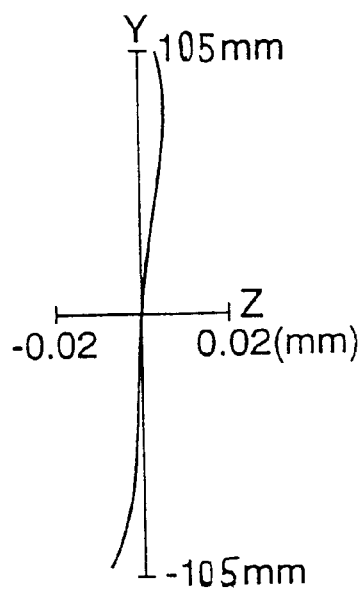
FIG. 3 shows bending of scan line in an embodiment 1 of the present invention.
Figure 4A:
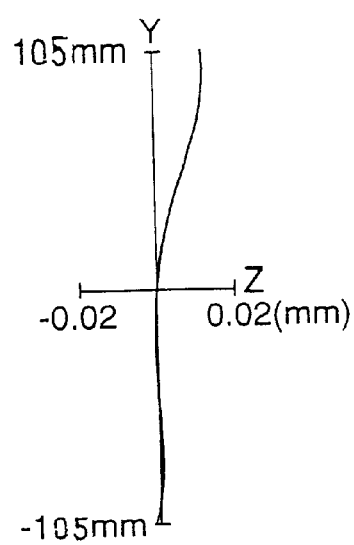
FIGS. 4A and 4B show bending of scan line in embodiments 2 and 3 of the present invention.
Figure 4B:
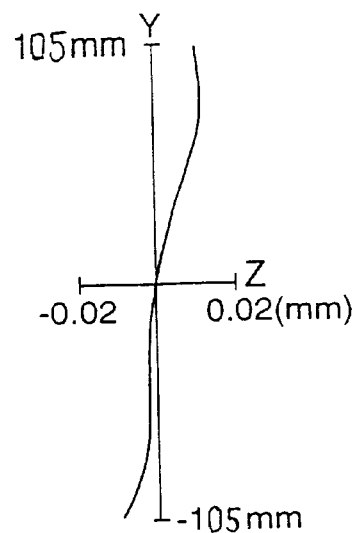
Figure 5A:
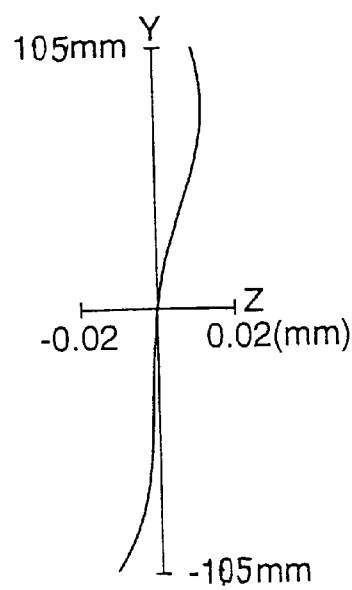
FIGS. 5A and 5B show bending of scan line in embodiments 4 and 5 of the present invention.
Figure 5B:
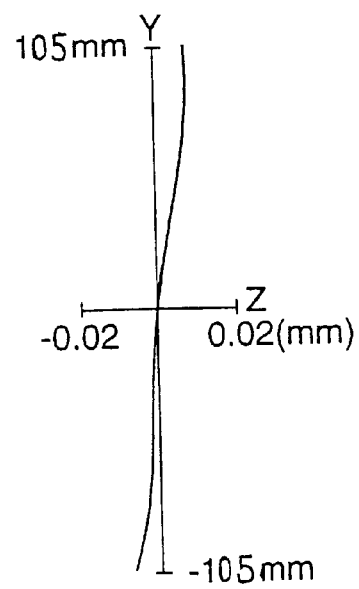
Figure 6A:
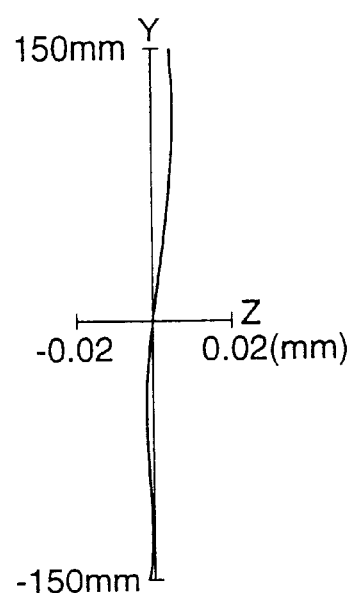
FIGS. 6A, 6B and 6C show bending of scan line in embodiments 6, 7 and 8 of the present invention.
Figure 6B:
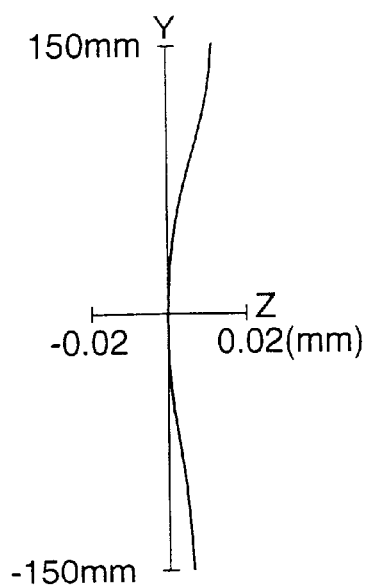
Figure 6C:
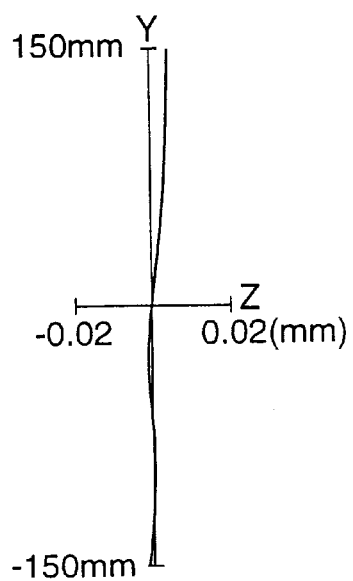

The bending of scan line in the embodiment 1 is shown in FIG. 3, those in the embodiments 2 and 3 are shown in FIGS. 4A and 4B, respectively, those in the embodiments 4 and 5 are shown in FIGS. 5A and 5B, respectively, those in the embodiments 6, 7 and 8 are shown in FIGS. 6A, 6B and 6C, respectively. In each of the embodiments 1 through 8, as the value of D calculated by the formula (4) remains within the range of the conditional formula (5), the bending of scan line is corrected satisfactorily.

Further, in order to further reduce the amount in bending of scan line, it is preferable that the following conditional formula holds:

$$3.5<(d2\times\sin\theta 2)/(d1\times\sin\theta 1\times|\beta|)<6.0$$

where:
θ1 denotes the rotation angle of the transmission optical component having approximately planar surfaces on both sides thereof, which is the one nearer to the light deflector;

θ2 denotes the rotation angle of the transmission optical component having approximately planar surfaces on both sides thereof, which is the one farther from the light deflector;

β denotes the sub-scanning lateral magnification between the light deflector and the surface to be scanned;

d1 denotes the thickness of the transmission optical component having approximately planar surfaces on both sides thereof, which is the one nearer to the light deflector; and d2 denotes the thickness of the transmission optical component having approximately planar surfaces on both sides thereof, which is the one farther from the light deflector.

Each transmission optical component having approximately planar surfaces on both sides thereof may be made either of glass or of resin, and, also, may be such that the surfaces on both sides thereof are not parallel to one another, and may be such that the surfaces on both sides thereof are not planar but have slight curvatures.

Figure 7A:
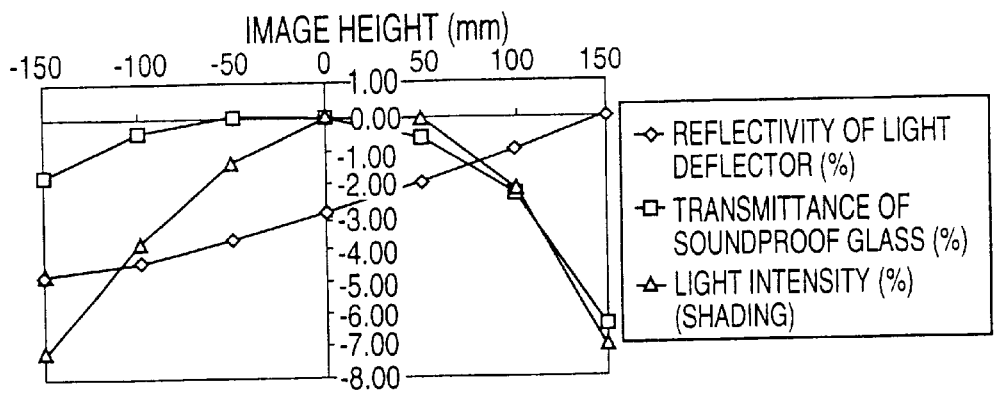
FIGS. 7A and 7B show relationship among difference in reflectivity of a light deflector, difference in transmittance of a soundproof glass (transmission optical component) and shading (unevenness of light intensity on a surface to be scanned) when the soundproof glass disposed nearer to the light deflector is inclined by a predetermined angle in a deflection scanning plane (main scanning section) with respect to the surface to be scanned.
Figure 7B:
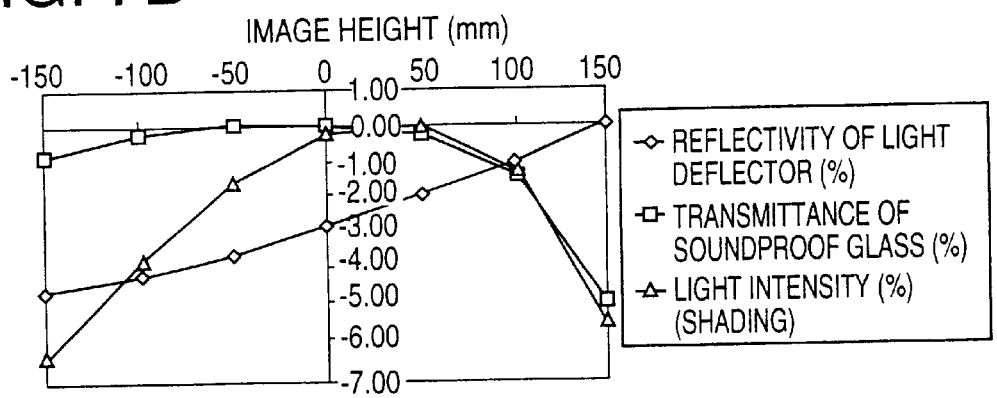
Figure 7C:
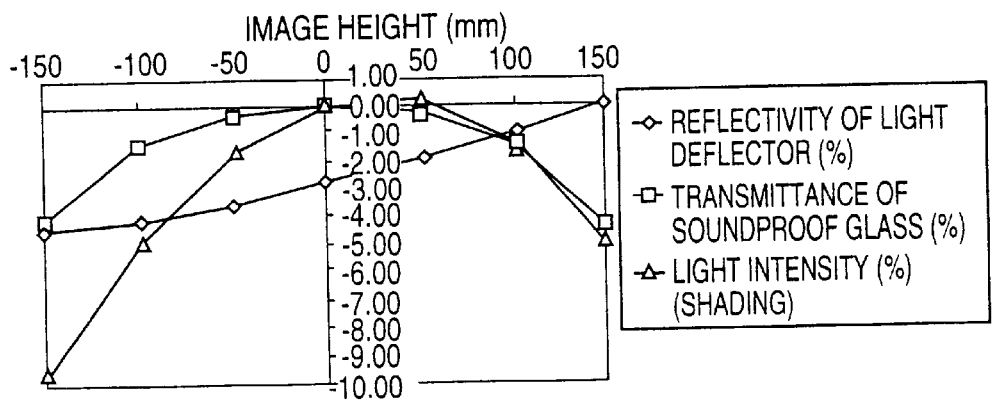
FIG. 7C shows relationship among difference in reflectivity of the light deflector, difference in transmittance of the soundproof glass (transmission optical component) and shading (unevenness of light intensity on the surface to be scanned) when the soundproof glass disposed nearer to the light deflector is not inclined in the deflection scanning plane (main scanning section) with respect to the surface to be scanned.

Reduction in shading will now be described. FIGS. 7A, 7B and 7C show relationships among the difference in reflectivity of the light deflector, difference in transmittance of the soundproof glass (first parallel plate 4) and shading with respect to image height in conditions 1 and 2 shown below in cases of the above-mentioned embodiments 5 through 8:

|  | Condition 1 (FIG. 7A) | Condition 2 (FIG. 7B) |
|---|---|---|
| Light deflector | SiO single-layer coating on an aluminum substrate | SiO single-layer coating on an aluminum substrate |
| Soundproof glass | a single-layer | a double-layer |

-continued

|  | Condition 1 (FIG. 7A) | Condition 2 (FIG. 7B) |
|---|---|---|
| (first parallel plate 4) | reflection-preventing film on a glass substrate | reflection-preventing film on a glass substrate |
| Scanning and imaging lenses | Non-coating | Non-coating |
| Dustproof glass (second parallel plate 7) | Non-coating | Non-coating |

When the polarization directions of the beam directed to the light deflector are approximately perpendicular to the deflection scanning directions (main scanning directions), the reflectivity of the light deflector and the transmittance of the soundproof glass (first parallel plate 4) are canceled out by one another, as shown in FIGS. 7A and 7B, as a result of the soundproof glass (first parallel plate 4) being inclined with respect to the surface to be scanned in the deflection scanning plane (main scanning section) by a predetermined angle α (for example, α=8 (degrees)). Thereby, shading (difference in light intensity according to image height on the surface to be scanned) is corrected satisfactorily.

Further, FIG. 7C shows a comparison example calculated for a case in which, in the above-mentioned condition 1, the soundproof glass is not inclined with respect to the surface to be scanned in the deflection scanning plane. As shown in the figure, the shading is larger than those of FIGS. 7A and 7B.

Thus, when the polarization directions of the beam directed to the light deflector are approximately perpendicular to the deflection scanning directions (main scanning directions), the reflectivity of the light deflector and the transmittance of the soundproof glass are canceled out by one another, as a result of the soundproof glass (first parallel plate 4) being inclined with respect to the surface 8 to be scanned in the deflection scanning plane (main scanning section) by the predetermined angle α. Thereby, shading (difference in light intensity according to image height on the surface to be scanned) can be corrected satisfactorily.

The present invention is not limited to the above-described embodiments, and variations and modifications may be made without departing from the scope of the present invention.

The present application is based on Japanese priority application No. 2000-103004, filed on Apr. 5, 2000, the entire contents of which are hereby incorporated by reference.

What is claimed is:

1. An optical scanning device comprising:

a light deflector performing deflection scanning through reflection of a beam coming from a light source; and at least one scanning and imaging component condensing the beam having undergone the deflection scanning performed by said light deflector toward a surface to be scanned, these components being enclosed by an optical housing, wherein:

said device further comprises two transmission optical components each having approximately planar surfaces on both sides thereof;

said two transmission optical components are disposed so as to have said at least one scanning and imaging component inserted therebetween;

one of said two transmission optical components is disposed at a light exit of a cover covering said light deflector;

the other of said two transmission optical components is disposed at a light exit of said optical housing;

said two transmission optical components are inclined in a same direction in a sub-scanning section including a straight line perpendicular to the surface to be scanned;

said transmission optical component disposed at the light exit of said cover of said light deflector is inclined with respect to the surface to be scanned in a deflection scanning plane;

said transmission optical component disposed at the light exit of said optical housing lies approximately in parallel to the surface to be scanned in the deflection scanning plane; and polarization directions of the beam directed to said light deflector are approximately perpendicular to the deflection scanning plane.

2. The optical scanning device as claimed in claim 1, wherein the following conditional formula is satisfied:

$$2.5 < (d2 \times \sin \theta 2)/(d1 \times \sin \theta 1 \times |\beta|) < 7.0$$

where:

θ1 denotes a rotation angle of the transmission optical component having the approximately planar surfaces on both sides thereof, which is the one nearer to said light deflector;

θ2 denotes a rotation angle of the other transmission optical component having the approximately planar surfaces on both sides thereof;

β denotes a sub-scanning lateral magnification between said light deflector and the surface to be scanned;

d1 denotes a thickness of said transmission optical component having the approximately planar surfaces on both sides thereof, which is the one nearer to said light deflector; and d2 denotes a thickens of said other transmission optical component having the approximately planar surfaces on both sides thereof.

3. An optical scanning device comprising:

light deflecting means for performing deflection scanning through reflection of a beam coming from light source-means; and scanning and imaging means for condensing the beam having undergone the deflection scanning performed by said light deflecting means onto a surface to be scanned, these means being enclosed by an optical housing, wherein:

said device further comprises two transmission optical components each having approximately planar surfaces on both sides thereof;

said two transmission optical components are disposed so as to have said scanning and imaging means inserted therebetween;

one of said two transmission optical components is disposed at a light exit of a cover covering said light deflecting means;

the other of said two transmission optical components is disposed at a light exit of said optical housing;

said two transmission optical components are inclined in a same direction in a sub-scanning section including a straight line perpendicular to the surface to be scanned;

said transmission optical component disposed at the light exit of said cover of said light deflector is inclined with respect to the surface to be scanned in a deflection scanning plane;

said transmission optical component disposed at the light exit of said optical housing lies approximately in parallel to the surface to be scanned in the deflection scanning plane; and polarization directions of the beam directed to said light deflecting means are approximately perpendicular to the deflection scanning plane.

4. The optical scanning device as claimed in claim 3, wherein the following conditional formula is satisfied:

$$2.5 < (d2 \times \sin \theta 2)/(d1 \times \sin \theta 1 \times |\beta|) < 7.0$$

where:

$\theta 1$ denotes a rotation angle of the transmission optical component having the approximately planar surfaces on both sides thereof, which is the one nearer to said light deflecting means;

$\theta 2$ denotes a rotation angle of the other transmission optical component having the approximately planar surfaces on both sides thereof;

$\beta$ denotes a sub-scanning lateral magnification between said light deflecting means and the surface to be scanned;

d1 denotes a thickness of said transmission optical component having the approximately planar surfaces on both sides thereof, which is the one nearer to said light deflecting means; and d2 denotes a thickens of said other transmission optical component having the approximately planar surfaces on both sides thereof.

* * * * *